US011465110B2

(12) United States Patent
Brandt

(10) Patent No.: US 11,465,110 B2
(45) Date of Patent: Oct. 11, 2022

(54) SCALEABLE INLINE BUFFER DILUTION SCHEME

(71) Applicant: Asahi Kasei Bioprocess America, Inc., Glenview, IL (US)

(72) Inventor: Michael D. Brandt, Cassopolis, MI (US)

(73) Assignee: Asahi Kasei Bioprocess America, Inc., Glenview, IL (US)

( * ) Notice: Subject to any disclaimer, the term of this patent is extended or adjusted under 35 U.S.C. 154(b) by 356 days.

(21) Appl. No.: 16/727,735

(22) Filed: Dec. 26, 2019

(65) Prior Publication Data

US 2021/0197150 A1    Jul. 1, 2021

(51) Int. Cl.
| | |
|---|---|
| *B01F 35/00* | (2022.01) |
| *B01F 35/21* | (2022.01) |
| *B01F 23/45* | (2022.01) |
| *G05D 11/13* | (2006.01) |
| *B01F 35/83* | (2022.01) |
| *B01F 35/71* | (2022.01) |

(52) U.S. Cl.
CPC .......... *B01F 35/2132* (2022.01); *B01F 23/45* (2022.01); *B01F 35/2111* (2022.01); *B01F 35/2133* (2022.01); *B01F 35/7176* (2022.01); *B01F 35/833* (2022.01); *G05D 11/138* (2013.01)

(58) Field of Classification Search
CPC ... B01F 35/833; B01F 35/2133; G05D 11/138
See application file for complete search history.

(56) References Cited

U.S. PATENT DOCUMENTS

| | | | |
|---|---|---|---|
| 8,271,139 B2 | 9/2012 | Bellafiore et al. | |
| 9,636,648 B2 | 5/2017 | Brandt | |
| 2008/0279038 A1* | 11/2008 | Bellafiore | G05D 11/139 366/152.4 |
| 2012/0217192 A1 | 8/2012 | Blank et al. | |
| 2016/0243512 A1* | 8/2016 | Brandt | G01N 27/4167 |

OTHER PUBLICATIONS

"IBD 1K Inline Buffer Dilution System", Asahi Kasei Bioprocess, pp. 1-4, 2016.
"PuraLev Life Science Pump Series", Levitronix, pp. 1-8, Sep. 20, 2018.
International Search Report and Written Opinion received for PCT/US2020/061719 dated Feb. 22, 2021.

* cited by examiner

*Primary Examiner* — Anshu Bhatia
(74) *Attorney, Agent, or Firm* — Marshall, Gerstein & Borun LLP

(57) ABSTRACT

An inline buffer dilution system is provided that includes a first flow control valve fluidly connected to a supply of diluent liquid, second and third flow control valves fluidly connected to supplies of a first buffer and a second buffer, respectively, and a mixing pump fluidly connected to the first, second, and third flow control valves and configured to mix an amount of the diluent liquid, the first buffer, and the second buffer to produce a diluted buffer solution. The system further includes a backpressure control valve configured to generate a backpressure that promotes mixing within the mixing pump, and a controller configured to control the backpressure based on the amount of the diluent liquid, the first buffer, and the second buffer being mixed in the mixing pump, such that the mixing pump yields a minimum mixing threshold across a range of fluid flows.

18 Claims, 2 Drawing Sheets

SCALEABLE INLINE BUFFER DILUTION SCHEME

FIELD OF THE DISCLOSURE

The present disclosure generally relates to inline buffer dilution systems and, more particularly, to an inline buffer dilution system that is scalable across a range of fluid flows.

BACKGROUND

It is common to mix two or more liquids together in order to yield a desired concentration or other characteristics (e.g., pH, conductivity, optical density, refractive index, etc.) of the constituent liquids. Indeed, this mixing, which may be referred to as blending, is fundamental to many industrial segments. As an example, blending systems are used to create blended liquids that are provided to chromatography columns in order to permit the separation of mixtures for analysis or purification.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, in which:

DETAILED DESCRIPTION

Figure 1:
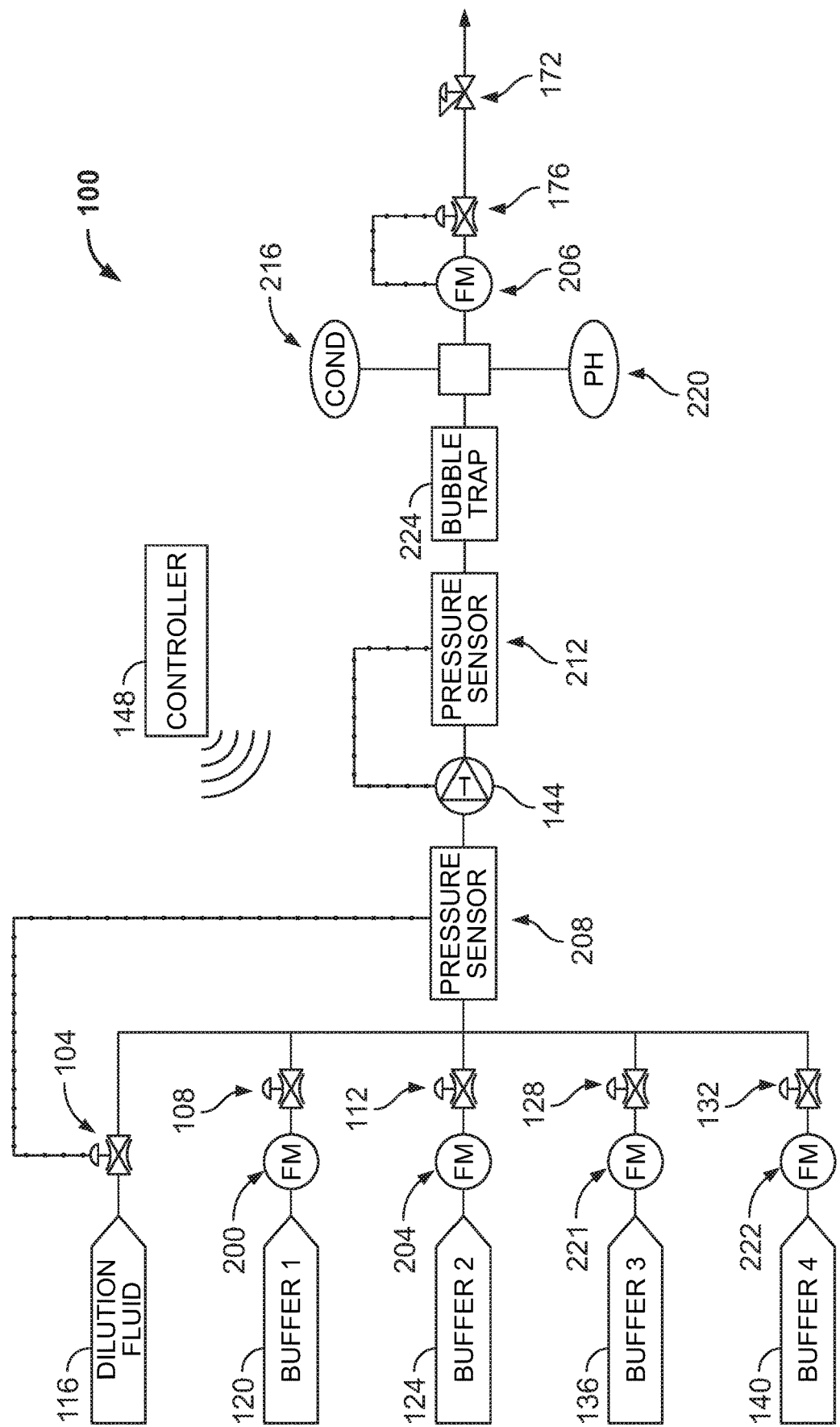
FIG. 1 is a schematic illustration of an example of an inline buffer dilution system constructed in accordance with the teachings of the present disclosure.

FIG. 1 illustrates an example of an inline buffer dilution system 100 constructed in accordance with the teachings of the present disclosure. The inline buffer dilution system 100 is generally configured to mix two or more liquids in a manner that yields a diluted solution having one or more desired characteristics (e.g., a desired pH, a desired conductivity, a desired temperature, a desired optical density, a desired refractive index, etc.). At the same time, the inline buffer dilution system 100 is configured to yield a minimum mixing threshold across a range of fluid flows, such that the inline buffer dilution system 100 is scalable depending on the given application.

As illustrated in FIG. 1, the inline buffer dilution system 100 generally includes a first flow control valve 104, a second flow control valve 108, and a third flow control valve 112. The first flow control valve 104, which in this example takes the form of a proportional pinch valve, is adapted to fluidly communicate with a vessel 116 containing a supply of diluent liquid (e.g., water). The second flow control valve 108, which in this example also takes the form of a proportional pinch valve, is adapted to fluidly communicate with a first vessel 120 containing a supply of a first buffer (e.g., a phosphate, a salt, a pH tempering, an alcohol, an organic, a nutrient, etc.) The third flow control valve 112, which in this example also takes the form of a proportional pinch valve, is adapted to fluidly communicate with a second vessel 124 containing a supply of a second buffer (e.g., a phosphate, a salt, a pH tempering, an alcohol, an organic, a nutrient, etc.) that is different from the first buffer. It will be appreciated that the vessel 116, the first vessel 120, and the second vessel 124 can, but need not, be part of the inline buffer dilution system 100. It will also be appreciated that the inline buffer dilution system 100 can include additional flow control valves (e.g., flow control valves 128, 132), which are in turn adapted to fluidly communicate with additional vessels of buffers (e.g., a third vessel 136 containing a supply of a third buffer and a fourth vessel 140 containing a supply of a fourth buffer), as illustrated in FIG. 1.

Figure 2:
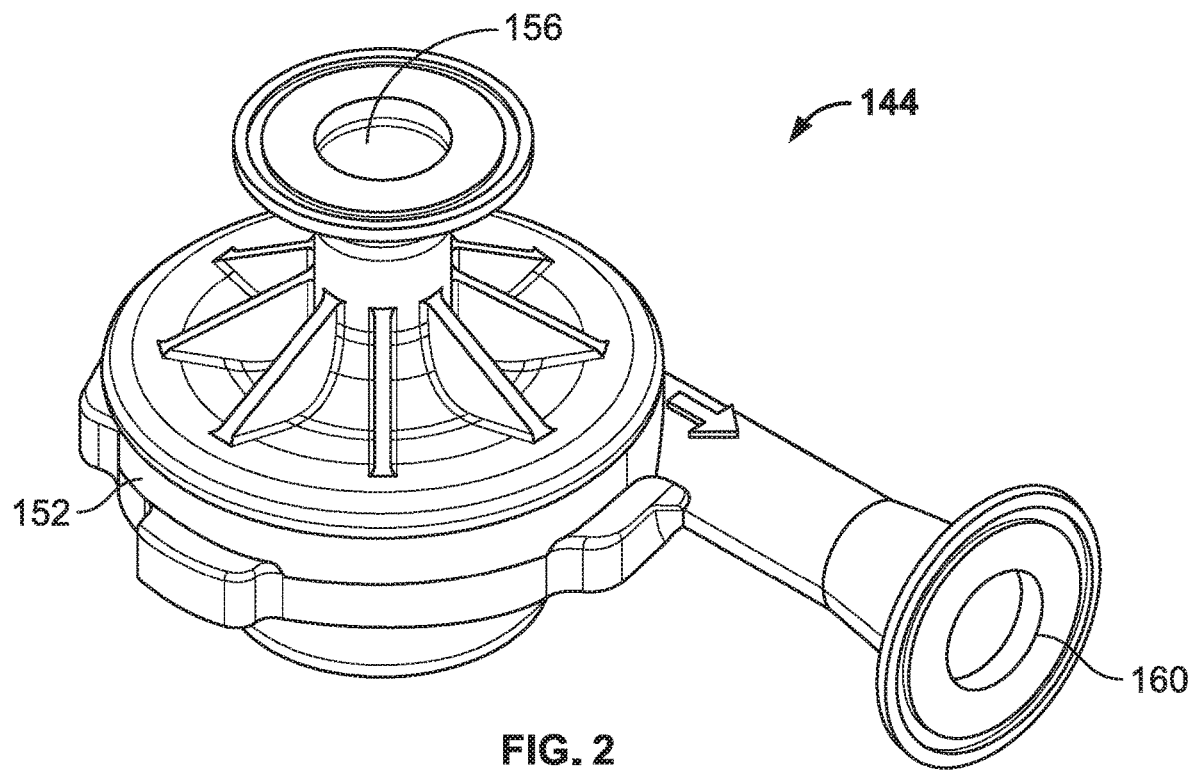
FIG. 2 is a perspective view of the mixing pump employed in the inline buffer dilution system of FIG. 1.
Figure 3:
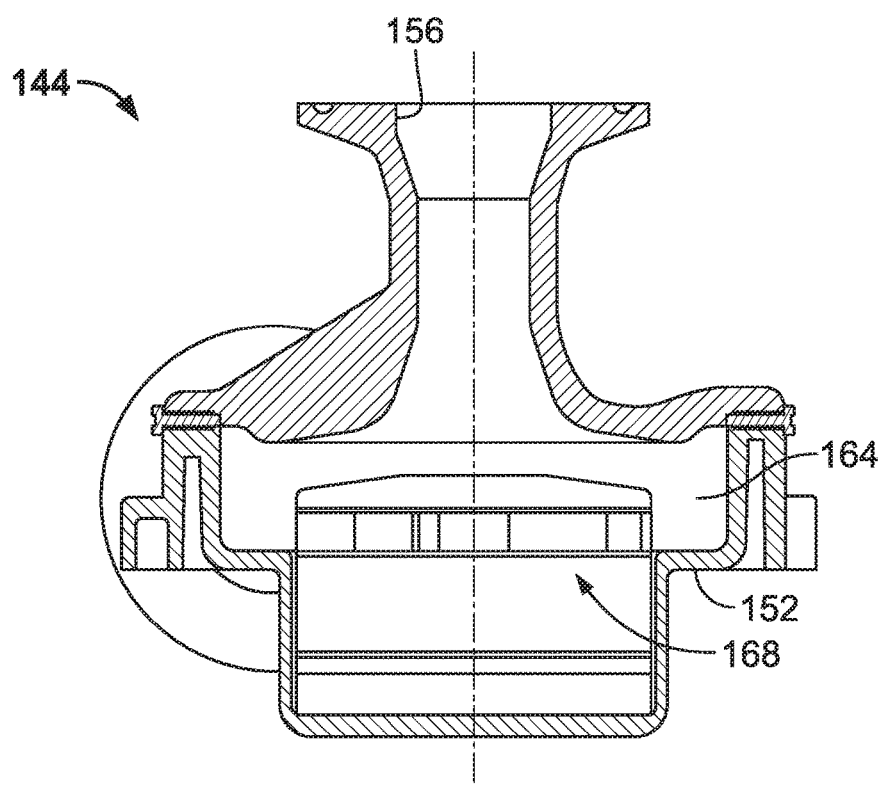
FIG. 3 is a cross-sectional view of the mixing pump of FIG. 2.

As also illustrated in FIG. 1, the inline buffer dilution system 100 also generally includes a mixing pump 144 and a controller 148 in the form of a programmable logic controller that is communicatively connected (via a wired or wireless connection) to the mixing pump 144 and the other components of the inline buffer dilution system 100 to control operation of the inline buffer dilution system 100. FIGS. 2 and 3 illustrate one specific example of the mixing pump 144 that can be employed in the system 100. The mixing pump 144 illustrated in FIGS. 2 and 3 is a single-use mixing pump that is manufactured by, for example, Levitronix. The mixing pump 144 in this example thus includes a housing 152 having an inlet port 156, an outlet port 160, and a mixing chamber 164 arranged between the inlet port 156 and the outlet port 160, as well as an impeller 168 that is rotatable within the housing 152 to mix fluids in the mixing chamber 148.

Turning back to FIG. 1, the mixing pump 144 is arranged downstream of and fluidly connected to the first, second, and third flow control valves 104, 108, and 112. The controller 148 controls the first, second, and third flow control 104, 108, and 112 so that the first, second, and third flow control valves 104, 108, and 112 respectively supply a desired amount of each (and a desired total amount) of the diluent liquid, the first buffer, and the second buffer to the mixing pump 144 via the inlet port 160. The controller 148 also causes the impeller 168 of the mixing pump 144 to rotate, thereby mixing the supplied diluent liquid, the first buffer, and the second buffer into a diluted buffer solution having the one or more desired characteristics. The diluted buffer solution produced by the mixing is in turn output from the mixing pump 144 via the outlet port 160.

With reference still to FIG. 1, the inline buffer dilution system 100 further includes a backpressure control valve 172 arranged downstream of the mixing pump 144 and controlled by the controller 148. The controller 148 causes the backpressure control valve 172, which in this example is a pilot driven backpressure regulator, to generate a backpressure that is sensed by the mixing pump 144 and, in turn, promotes mixing within the mixing pump 144. While the generation of the backpressure reduces the efficiency of the mixing pump 144, the usage of the backpressure in this manner effectively creates a recirculation or mixing variable that is adjustable (via the controller 148) depending on the amount of fluid (in this case, the amount of the diluent liquid, the first buffer, and the second buffer) flowing into and being mixed in the mixing pump 144. When, for example, the amount of the fluid flowing into and being mixed in the mixing pump 144 is increased, the controller 148 can increase the recirculation variable by causing the backpressure control valve 172 to increase the generated backpressure, thereby driving further recirculation and ensuring that adequate mixing is performed within the mixing pump 144 at this higher flow level. Conversely, when the amount of the fluid flowing into and being mixed in the mixing pump 144 is decreased, the controller 148 can decrease the recirculation variable by causing the backpressure control valve 172 to decrease the generated backpressure, thereby driving less recirculation (as less recirculation is needed at this lower flow level) but still ensuring that adequate mixing is performed within the mixing pump 144.

By adjusting the backpressure generated by the backpressure control valve 172 based on the fluid flowing into and being mixed in the mixing pump 144, the mixing in the mixing pump 144 is effectively normalized across a range of fluid flows. In this example, the mixing in the mixing pump 144 is effectively normalized across a range equal to between 2 and 20 liters per minute. In other examples, however, the range of fluid flows may vary. In any case, the mixing pump 144 has or yields a minimum mixing threshold across this range of fluid flows. In other words, the mixing pump 144 has or yields a minimum mixing threshold at any amount of fluid flow in this range, regardless of how much fluid is flowing into and being mixed in the mixing pump 144.

Additionally, in this example, the controller 148 controls the first flow control valve 104 in a manner that creates a negative pressure immediately upstream of the mixing pump 144. More particularly, the controller 148 restricts a flow of the diluent liquid through the first flow control valve 104, which in turn creates a negative pressure (i.e., the pressure is less than atmospheric pressure) immediately upstream of the mixing pump 144. The creation of this negative pressure serves to automatically drive the first buffer solution in the first vessel 120 and the second buffer solution in the second vessel 124 through the second flow control valve 108 and the third flow control valve 112, respectively, and to the mixing pump 144. This, in turn, obviates the need to externally pressurize the first vessel 120 of the first buffer solution and the second vessel 124 of the second buffer solution to pressures above (and in some cases well above) atmospheric pressure, which must otherwise be done in order to drive the first buffer solution and the second buffer solution through their respective flow control valves 108, 112 to the mixing pump 144. Instead, the first vessel 120 of the first buffer solution and the second vessel 124 of the second buffer solution can be pressurized using only atmospheric pressure to drive the first buffer solution and the second buffer solution through their respective flow control valves 108, 112 to the mixing pump 144. Thus, the first vessel 120 of the first buffer solution and the second vessel 124 of the second buffer solution can, for example, each take the form of a single-use or disposable container (e.g., a single-use bag) that houses the respective buffer solution and is made of a disposable material such as a plastic material or polymer material or film material like gamma stable plastic (which can withstand gamma radiation). However, in other examples, the first vessel 120 and/or the second vessel 124 can take the form of a container or other housing that is made of a non-disposable material (e.g., stainless steel or any other metal material).

The inline buffer dilution system 100 in this example further includes one additional control valve—flow control valve 176. The flow control valve 176, which in this example takes the form of a proportional pinch valve, is arranged between the mixing pump 144 and the backpressure control valve 172. So positioned, the flow control valve 176 is configured to control the flow of the diluted buffer solution from the mixing pump 144 to the backpressure control valve 172.

The inline buffer dilution system 100 also includes a plurality of different sensors that are communicatively connected to the controller 148 and provide feedback to the controller 148 during operation of the inline buffer dilution system 100 in order to ensure the proper operation of the inline buffer dilution system 100. In this example, as illustrated in FIG. 1, the inline buffer dilution system 100 includes a first flowmeter 200, a second flowmeter 204, a third flowmeter 206, a first pressure sensor 208, a second pressure sensor 212, a conductivity sensor 216, and a pH sensor 220. In other examples, however, the inline buffer dilution system 100 can include more, less, and/or different sensors (e.g., different property sensors). As an example, the inline buffer dilution system 100 need not include the conductivity sensor 216 or the pH sensor 220. As another example, when the inline buffer dilution system 100 includes the flow control valves 128, 132 and the third and fourth vessels 136, 140, the inline buffer dilution system 100 can include a fourth flowmeter 221 arranged between the third vessel 136 and the flow control valve 128, and a fifth flowmeter 222 arranged between the fourth vessel 140 and the flow control valve 132. In other examples, the flowmeters 221, 222 can be positioned after (i.e., downstream of) the flow control valves 128, 132, respectively, in the inline buffer dilution system 100.

As illustrated in FIG. 1, the first flowmeter 200 is arranged between the first vessel 120 of the first buffer solution and the second flow control valve 108, such that the first flowmeter 200 provides data to the controller 148 indicative of the amount of the first buffer solution flowing through the second flow control valve 108 (and to the mixing pump 144). The second flowmeter 204 is arranged between the second vessel 124 of the second buffer solution and the third flow control valve 112, such that the second flowmeter 204 provides data to the controller 148 indicative of the amount of the second buffer solution flowing through the third flow control valve 112 (and to the mixing pump 144). In other examples, the flowmeters 200, 204 can be positioned after the flow control valves 108, 112, respectively, in the inline buffer dilution system 100.

The third flowmeter 206 is arranged between the mixing pump 144 and the backpressure control valve 172, and, more particularly, between the flow control valve 176 and the conductivity and pH sensors 216, 220. So arranged, the third flowmeter 206 provides data to the controller 148 indicative of the amount of the diluted buffer solution flowing through the flow control valve 176.

The first pressure sensor 208 is arranged between the first, second, and third flow control valves 104, 108, and 112 and the mixing pump 144, such that the first pressure sensor 208 provides data to the controller 148 indicative of the pressure downstream of the first, second, and third flow control valves 104, 108, and 112, and upstream of the mixing pump 144. The first pressure sensor 208 also helps to ensure that there is a negative pressure immediately upstream of the mixing pump 144, which, as discussed above, serves to automatically drive the first buffer solution from the first vessel 120 and the second buffer solution from the second vessel 124 across their respective flow control valves 108, 112 to the mixing pump 144 (and thereby obviates the need to externally pressurize the first vessel 120 and the second vessel 124). The second pressure sensor 212, meanwhile, is arranged between the mixing pump 144 and the backpressure control valve 172, such that the second pressure sensor 212 provides data to the controller 148 indicative of the pressure downstream of the mixing pump 144 but upstream of the backpressure control valve 172.

The conductivity sensor 216 is also arranged between the mixing pump 144 and the backpressure control valve 172, but at a position downstream of the second pressure sensor 212. The conductivity sensor 216 measures the conductivity of the diluted buffer solution output by the mixing pump 144 and provides the controller 148 with data indicative of that measured conductivity, thereby helping to ensure that the diluted buffer solution has the desired conductivity. In other examples, the conductivity sensor 216 can be positioned elsewhere in the inline buffer dilution system 100. The pH sensor 220 is likewise arranged between the mixing pump 144 and the backpressure control valve 172 at a position downstream of the second pressure sensor 212. The pH sensor 220 measures the pH level of the diluted buffer solution output by the mixing pump 144 and provides the controller 148 with data indicative of the measured pH level, thereby helping to ensure that the diluted buffer solution has the desired pH. In other examples, the pH sensor 220 can be positioned elsewhere in the inline buffer dilution system 100.

Optionally, and as illustrated in FIG. 1, the inline buffer dilution system 100 may include a bubble trap 224 configured to remove gas bubbles from the diluted buffer solution output by the mixing pump 144. In this example, the bubble trap 224 is arranged between the mixing pump 144 and the conductivity and pH sensors 216, 220, such that the bubble trap 224 is configured to remove gas bubbles from the diluted buffer solution after exiting the mixing pump 144 and prior to any data being obtained about the diluted buffer solution by the conductivity and pH sensors 216, 220. In other examples, the bubble trap 224 can be positioned elsewhere in the inline buffer dilution system 100.

Optionally, the inline buffer dilution system 100 may include any number of additional components not explicitly illustrated in FIG. 1. In some examples (e.g., when the one or more desired characteristics include a desired temperature), the inline buffer dilution system 100 may include a heat exchanger instead of, or in addition to, the bubble trap 224. In turn, the heat exchanger would be arranged between the mixing pump 144 and the conductivity and pH sensors 216, 220, so as to help the controller 148 produce a diluted solution having the desired temperature. In some examples (e.g., when the inline buffer dilution system 100 includes the fourth vessel 140), the inline buffer dilution system 100 may include a heat exchanger, a pump, a sensor (e.g., a pressure sensor, a bubble sensor, etc.), a pressure regulator, or other component arranged between the fourth vessel 140 and the fifth flowmeter 222. In some examples, the inline buffer dilution system 100 may include a sensor (e.g., a temperature sensor, a density sensor, an optical sensor, etc.) arranged between the conductivity and pH sensors 216, 220 and the third flowmeter 206.

Finally, it will be appreciated that the above-described components of the inline buffer dilution system 100 are connected together using conduit extending therebetween. Further, it will be appreciated that the above-described components of the inline buffer dilution system 100 may be made from one or more different materials. As discussed above, the first vessel 120 of the first buffer solution and the second vessel 124 of the second buffer solution can, for example, each take the form of a container made of a disposable material. Other components of the inline buffer dilution system 100, e.g., the first, second, and third flow control valves 104, 108, and 112, the mixing pump 144, and the conduit connecting the various components of the system 100, are also preferably made from a single-use or disposable material, such as a plastic material or polymer material or film material like gamma stable plastic (which can withstand gamma radiation). However, in some examples, the conduit and/or other components of the inline buffer dilution system 100 may instead be made from a metal material (e.g., stainless steel).

Those skilled in the art will recognize that a wide variety of modifications, alterations, and combinations can be made with respect to the above described embodiments without departing from the scope of the disclosure, and that such modifications, alterations, and combinations are to be viewed as being within the ambit of the inventive concept.

The invention claimed is:

1. An inline buffer dilution system, comprising:
a first flow control valve adapted to communicate with a vessel comprising a supply of diluent liquid;
a second flow control valve adapted to communicate with a first vessel comprising a supply of a first buffer;
a third flow control valve adapted to communicate with a second vessel comprising a supply of a second buffer;
a mixing pump fluidly connected to the first, second, and third flow control valves and configured to receive an amount of the diluent liquid, the first buffer, and the second buffer via the first, second, and third flow control valves, respectively, the mixing pump further configured to mix the amount of the diluent liquid, the first buffer, and the second buffer to produce a diluted buffer solution;
a backpressure control valve arranged downstream of the mixing pump and configured to generate a backpressure that promotes mixing within the mixing pump; and
a controller communicatively connected to the mixing pump and the backpressure control valve, the controller configured to control the backpressure generated by the backpressure control valve based on the amount of the diluent liquid, the first buffer, and the second buffer being mixed in the mixing pump, such that the mixing pump yields a minimum mixing threshold across a range of fluid flows,
wherein the controller is configured to restrict a flow of the diluent liquid through the first flow control valve, thereby creating a negative pressure upstream of the mixing pump that drives the supply of the first buffer and the supply of the second buffer through the second flow control valve and the third flow control valve, respectively, and to the mixing pump.

2. The inline buffer dilution system of claim 1, wherein the backpressure control valve is configured to generate a first backpressure when the mixing pump mixes a first amount of the diluent liquid, the first buffer, and the second buffer, and wherein the backpressure control valve is configured to generate a second backpressure different from the first backpressure when the mixing pump mixes a second amount of the diluent liquid, the first buffer, and the second buffer.

3. The inline buffer dilution system of claim 2, wherein when the second amount is less than the first amount, the second backpressure is less than the first backpressure.

4. The inline buffer dilution system of claim 1, further comprising the first vessel comprising the supply of the first buffer and the second vessel comprising the supply of the second buffer, wherein each of the first vessel and the second vessel is pressurized using only atmospheric pressure.

5. The inline buffer dilution system of claim 1, further comprising a conductivity sensor arranged between the mixing pump and the backpressure control valve, the conductivity sensor configured to detect the conductivity of the diluted buffer solution produced by the mixing pump.

6. The inline buffer dilution system of claim 1, further comprising a pH sensor arranged between the mixing pump and the backpressure control valve, the pH sensor configured to detect the pH of the diluted buffer solution produced by the mixing pump.

7. The inline buffer dilution system of claim 1, further comprising a first flowmeter fluidly coupled to the second flow control valve and a second flowmeter fluidly coupled to the third flow control valve, the controller communicatively connected to the first and second flowmeters and configured to obtain from the first and second flowmeters data indicative of the fluid flowing through the second and third flow control valves, respectively.

8. An inline buffer dilution system, comprising:
a first flow control valve adapted to communicate with a vessel comprising a supply of diluent liquid;
a second flow control valve adapted to communicate with a first vessel comprising a supply of a first buffer;
a third flow control valve adapted to communicate with a second vessel comprising a supply of a second buffer;
a mixing pump fluidly connected to the first, second, and third flow control valves and configured to receive an amount of the diluent liquid, the first buffer, and the second buffer via the first, second, and third flow control valves, respectively, the mixing pump further configured to mix the amount of the diluent liquid, the first buffer, and the second buffer to produce a diluted buffer solution;
a backpressure control valve arranged downstream of the mixing pump and configured to generate a backpressure that promotes mixing within the mixing pump;
a controller communicatively connected to the mixing pump and the backpressure control valve, the controller configured to control the backpressure generated by the backpressure control valve based on the amount of the diluent liquid, the first buffer, and the second buffer being mixed in the mixing pump, such that the mixing pump yields a minimum mixing threshold across a range of fluid flows; and
an additional flow control valve arranged between the mixing pump and the backpressure control valve, the controller configured to control a pressure differential across the additional flow control valve.

9. An inline buffer dilution system, comprising:
a vessel comprising a supply of diluent liquid;
a first vessel comprising a supply of a first buffer, the first vessel pressurized using only atmospheric pressure;
a second vessel comprising a supply of a second buffer, the second vessel pressurized using only atmospheric pressure;
a first flow control valve arranged downstream of and configured to communicate with the supply of diluent liquid;
a second flow control valve arranged downstream of and configured to communicate with the first vessel comprising the supply of the first buffer;
a third flow control valve arranged downstream of and configured to communicate with the second vessel comprising the supply of the second buffer;
a mixing pump fluidly connected to the first, second, and third flow control valves and configured to receive an amount of the diluent liquid, the first buffer, and the second buffer via the first, second, and third flow control valves, respectively, the mixing pump further configured to mix the amount of the diluent liquid, the first buffer, and the second buffer to produce a diluted buffer solution;
a backpressure control valve arranged downstream of the mixing pump and configured to generate a backpressure that promotes mixing within the mixing pump;
a controller communicatively connected to the mixing pump and the backpressure control valve, the controller configured to control the backpressure generated by the backpressure control valve based on the amount of the diluent liquid, the first buffer, and the second buffer being mixed in the mixing pump, such that the mixing pump yields a minimum mixing threshold across a range of fluid flows; and
an additional flow control valve arranged between the mixing pump and the backpressure control valve, the controller configured to control a pressure differential across the additional flow control valve.

10. The inline buffer dilution system of claim 9, wherein the backpressure control valve is configured to generate a first backpressure when the mixing pump mixes a first amount of the diluent liquid, the first buffer, and the second buffer, and wherein the backpressure control valve is configured to generate a second backpressure different from the first backpressure when the mixing pump mixes a second amount of the diluent liquid, the first buffer, and the second buffer.

11. The inline buffer dilution system of claim 10, wherein when the second amount is less than the first amount, the second backpressure is less than the first backpressure.

12. The inline buffer dilution system of claim 9, further comprising a conductivity sensor arranged between the mixing pump and the backpressure control valve, the conductivity sensor configured to detect the conductivity of the diluted buffer solution produced by the mixing pump.

13. The inline buffer dilution system of claim 9, further comprising a pH sensor arranged between the mixing pump and the backpressure control valve, the pH sensor configured to detect the pH of the diluted buffer solution produced by the mixing pump.

14. The inline buffer dilution system of claim 9, wherein the first vessel comprises a first container housing the supply of the first buffer and the second vessel comprises a second container housing the supply of the second buffer, and wherein each of the first and second containers is made from a disposable material.

15. The inline buffer dilution system of claim 14, wherein the disposable material comprises a gamma stable plastic material.

16. An inline buffer dilution system, comprising:
a vessel comprising a supply of diluent liquid;
a first vessel comprising a supply of a first buffer, the first vessel pressurized using only atmospheric pressure;
a second vessel comprising a supply of a second buffer, the second vessel pressurized using only atmospheric pressure;
a first flow control valve arranged downstream of and configured to communicate with the supply of diluent liquid;
a second flow control valve arranged downstream of and configured to communicate with the first vessel comprising the supply of the first buffer;
a third flow control valve arranged downstream of and configured to communicate with the second vessel comprising the supply of the second buffer;
a mixing pump fluidly connected to the first, second, and third flow control valves and configured to receive an amount of the diluent liquid, the first buffer, and the second buffer via the first, second, and third flow control valves, respectively, the mixing pump further configured to mix the amount of the diluent liquid, the first buffer, and the second buffer to produce a diluted buffer solution;

a backpressure control valve arranged downstream of the mixing pump and configured to generate a backpressure that promotes mixing within the mixing pump; and a controller communicatively connected to the mixing pump and the backpressure control valve, the controller configured to control the backpressure generated by the backpressure control valve based on the amount of the diluent liquid, the first buffer, and the second buffer being mixed in the mixing pump, such that the mixing pump yields a minimum mixing threshold across a range of fluid flows, wherein the controller is configured to restrict a flow of the diluent liquid through the first flow control valve, thereby creating a negative pressure upstream of the mixing pump that drives the supply of the first buffer and the supply of the second buffer through the second flow control valve and the third flow control valve, respectively, and to the mixing pump.

17. A method of producing a diluted buffer solution across a range of fluid flows, comprising:

providing a first flow control valve adapted to communicate with a vessel comprising a supply of diluent liquid, a second flow control valve adapted to communicate with a first vessel comprising a supply of a first buffer, and a third flow control valve adapted to communicate with a second vessel comprising a supply of a second buffer;

directing an amount of the diluent liquid, the first buffer, and the second buffer to a mixing pump via the first, second, and third flow control valves, respectively;

mixing the amount of the diluent liquid, the first buffer, and the second buffer in the mixing pump, thereby producing a diluted buffer solution;

generating, via a backpressure control valve arranged downstream of the mixing pump, a backpressure that promotes mixing within the mixing pump; and controlling, via a controller communicatively connected to the mixing pump and the backpressure control valve, the backpressure generated by the backpressure control valve based on the amount of the diluent liquid, the first buffer, and the second buffer being mixed in the mixing pump, such that the mixing pump yields a minimum mixing threshold across a range of fluid flows, wherein the controller is configured to restrict a flow of the diluent liquid through the first flow control valve, thereby creating a negative pressure upstream of the mixing pump that directs the supply of the first buffer and the supply of the second buffer through the second flow control valve and the third flow control valve, respectively, and to the mixing pump.

18. The method of claim 17, wherein the controlling comprises decreasing the backpressure generated by the backpressure control valve when the amount of the diluent liquid, the first buffer, and the second buffer being mixed in the mixing pump decreases.

* * * * *